Aug. 9, 1949.    R. A. HEISING    2,478,759

RADIO POSITION INDICATOR

Filed March 7, 1942

INVENTOR
R. A. HEISING
BY
E. V. Griggs
ATTORNEY

Patented Aug. 9, 1949

2,478,759

UNITED STATES PATENT OFFICE 2,478,759

RADIO POSITION INDICATOR

Raymond A. Heising, Summit, N. J., assignor to Bell Telephone Laboratories, Incorporated, New York, N. Y., a corporation of New York Application March 7, 1942, Serial No. 433,775

4 Claims. (Cl. 343—112)

This invention relates to electrical wave systems and particularly to systems for determining the position of a mobile body by means of electric waves.

The object of the invention is to transmit electrical waves from a known area to a mobile receiver in such form that the received waves may be converted into currents representing the coordinates of the direction from the mobile receiver to the known area.

A feature of the invention is a transmitting system at the known area having three spaced antennas supplied from a common generator of frequency varied waves, and having unequal electrical delays in the transmission paths from the generator to the antennas.

Another feature of the invention is a second similar transmitting system located in a second known area, whereby the received waves from the two transmitting systems may be respectively converted into currents representing the coordinates of the two directions to the two known areas, the intersection of the two directions being the location of the mobile body.

A further feature of the invention is an electrical system on the mobile body for receiving the waves from one or both of the transmitting systems and selecting the combined waves from desired pairs of the transmitting antennas.

Figure 1:
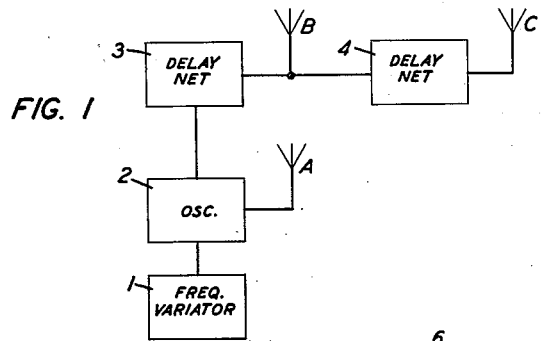
Figure 2:
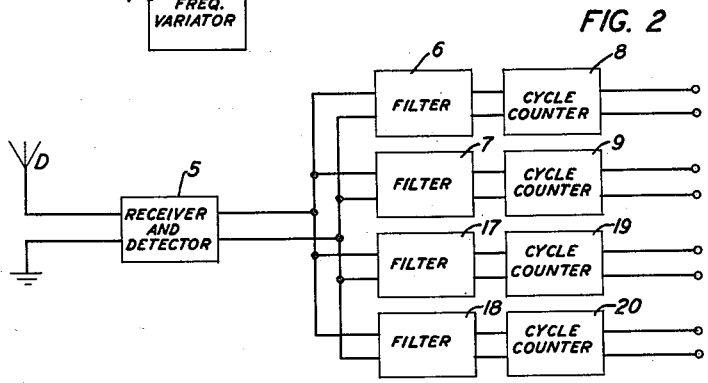
Figure 3:
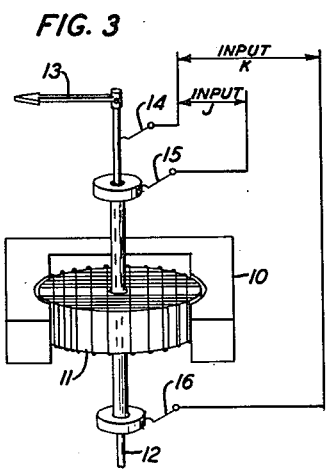
Figure 4:
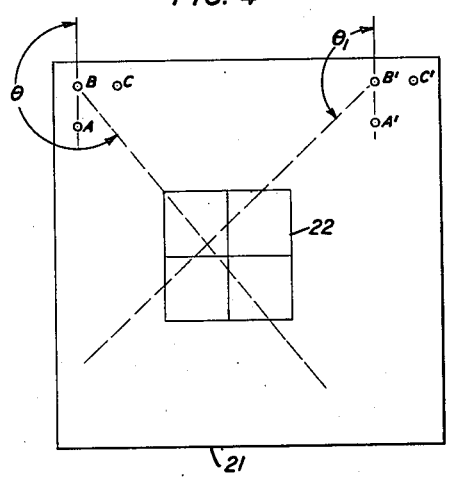

Other features of the invention will be apparent from the following description and the drawings, in which:

Fig. 1 schematically shows one transmitting system;

Fig. 2 schematically shows the receiving system on the mobile body;

Fig. 3 diagrammatically shows one form of indicator for use in the system;

Fig. 4 diagrammatically shows the method of locating the position of the mobile body.

The oscillator 2 and frequency variator 1, in Fig. 1, are of known design, and may be of the general type shown in United States Patent 2,045,072, June 23, 1936, L. Espenschied. Preferably the frequency variator 1 is so designed that the frequency of the oscillator 2 is varied linearly and repeatedly between desired limits.

The waves from the oscillator 2 are transmitted directly to the antenna A; through delay network 3 to antenna B; and through delay network 4 to antenna C.

The antenna B is located some suitable distance, such as one hundred meters, from antenna A. This distance will depend upon the accuracy desired, and the longest distance from the antennas to the mobile body at which measurements are made. The antenna C is located a similar distance from antenna B, at a known angle, preferably a right angle, to the line from antenna A to antenna B. If desired, these antennas may be in the cardinal directions, such as North-South and East-West.

The waves from the antennas A, B, and C, are radiated to the antenna D on the mobile body, and are received and detected by the broad band receiver 5.

The radiations from the antennas A and B will combine to produce in the output of the receiver 5 a beat current having a frequency, $f_{A-B} = J_1 - J_2 \cos \theta$. Similarly, the radiations from the antennas B and C will combine to produce a beat current having a frequency $$f_{B-C} = K_1 + K_2 \sin \theta$$

where $J_1$ and $K_1$ are the number of cycles delay of the radiated waves encompassed by the networks 3 and 4 alone, $J_2$ and $K_2$ are the number of cycles delay due to the wave passing in space from A to B, and from B to C and $\theta$ is the angle between the line joining A and B, and the line from the mobile body to the antenna B. The filter 6 selects the beat-note $J_1$ and should have a pass band width from $J_1+J_2$ to $J_1-J_2$. The filter 7 selects the beat-note $K_1$ and should have a pass band width from $K_1+K_2$ to $K_1-K_2$. The frequencies $J_1$ and $K_1$ are so chosen that the beat-note between waves from the antennas A and C falls outside the pass band of either filter.

The outputs of the filters 6 and 7 are respectively supplied to cycle counters 8 and 9, which may be of any suitable design, such as shown in United States Patent 2,113,011, April 5, 1938, E. L. C. White. The outputs of the cycle counters 8 and 9 will be unidirectional currents having amplitudes respectively proportional to $J_1-J_2 \cos \theta$ and $K_1+K_2 \sin \theta$. The components $J_1$ and $K_1$ result from the use of the delay networks 3 and 4, and will produce currents of constant amplitude. These components may be eliminated from the output of the cycle counter by two bucking batteries adjusted, say by potentiometers, to produce currents equal in amplitude to $J_1$ and $K_1$ but opposite in phase.

The indicator in Fig. 3 has a magnetic system 10, shown as a permanent magnet, which produces a constant magnetic field in a soft iron, or air core, armature 11 mounted for rotation on the shaft 12, driving a suitable indicator 13. Two windings are distributed on the armature in 90 degree relationship, one end of each winding being connected to a common point such as the shaft 12, or a common slip ring 14 and the other ends of the windings are respectively led out to individual slip rings 15, 16. The current proportional to the $J_2 \cos \theta$ component is supplied to the slip rings 14, 15 and flows through one winding, while the current proportional to the $K_2 \sin \theta$ component is supplied to the slip rings 14, 16 and flows through the other winding. The reaction of the currents with the constant magnetic field will cause the shaft 12, and indicator 13, to be rotated through the angle $\theta$ indicating the direction from the mobile body to the antenna array.

Two complete transmitting stations and antenna arrays may be located at known points an appreciable distance apart. Preferably, these stations are synchronized by known means so as to produce waves of the same frequency and the same variation in frequency. The delay networks in the second station produce delay times which differ from the delay times of the networks at the first station. Thus, as shown in Fig. 2, by adding the filters 17, 18, and cycle counters 19, 20 to the receiving set the currents from the second station may be detected and supplied to a second indicator of the type shown in Fig. 3. The second indicator will then indicate the direction from the mobile body to the second antenna array.

In Fig. 4, a suitable base 21, supports a map 22 of the area in which the mobile body is moving. The antenna arrays A, B, C and A', B', C', of the two transmitting stations are indicated on the base in the proper location and scale with respect to the map. The two indicators are located at B and B', and indicate the directions to the two stations. The intersection of the two indicated directions on the map will show the position of the mobile body on the map.

In a typical embodiment of the invention, the station A may operate on a frequency of 300 megacycles, which is linearly increased at the rate of 300 megacycles per second for $1/60$ second, then linearly decreased at the same rate for $1/60$ second. Antenna B may be located 100 meters from antenna A and the delay network 3 have a delay of $1.17 \times 10^{-6}$ seconds. The frequency of the waves radiated by the antenna B will lag behind the frequency of the waves radiated by the antenna A by 350 cycles. Antenna C may be located 100 meters from antenna B and the delay network 4 have a delay of $2 \times 10^{-6}$ seconds, so that the frequency of the waves radiated by the antenna C will lag behind the frequency of the waves radiated by the antenna B by 600 cycles. The beat frequency between the radiations from antennas A and B will vary with the direction between 250 and 450 cycles, and this will be the pass band of filter 6, Fig. 2. Similarly, the beat frequency between the radiations from the antennas B and C will vary with the direction between 500 and 700 cycles, and this will be the pass band of filter 7, Fig. 2. Under these conditions, $J_1 = 350$ cycles, $K_1 = 600$ cycles, and $$J_2 = K_2 = 100 \text{ cycles}$$

For the position indicator of Fig. 4, the added station A' would radiate a wave having a frequency of 299 megacycles, varied at the same rate and in synchronism with station A. Antenna B' would be 100 meters from antenna A' and antenna C' would be 100 meters from antenna B', the directions of A'B' and B'C' preferably corresponding with the directions AB and BC. The network between A' and B' may have a delay time of $4.33 \times 10^{-6}$ seconds, while the network between B' and C' may have a delay time of $5.17 \times 10^{-6}$ seconds. Under these conditions, the frequency of the waves radiated by the antenna B' will lag behind the frequency of the waves radiated by the antenna A' by 1300 cycles, with a variation with direction from 1200 to 1400 cycles, and the frequency of the waves radiated by the antenna C' will lag behind the frequency of the waves radiated by the antenna B' by 1550 cycles, with a variation with direction from 1450 to 1650 cycles. The filters 17, 18 in Fig. 2 would thus have pass bands from 1200 to 1400 cycles, and from 1450 to 1650 cycles, respectively.

The specific figures set forth are merely illustrative of typical values which may be varied within wide limits, and are not in any way a limitation on the scope of the invention as set forth in the attached claims.

What is claimed is:

1. In a radio system, means including a first antenna for radiating waves periodically varying in frequency throughout a predetermined range, means including a second antenna for radiating waves similar to the waves radiated by said first antenna but differing therefrom by an appreciable time interval, means including a third antenna for radiating waves similar to the waves radiated by said first antenna but differing therefrom by an appreciable time interval not equal to said first time interval, a receiving antenna, means associated with said receiving antenna for combining the waves radiated by one pair of said antennas to form a first combination frequency, and combining the waves radiated by another pair of said antennas to form a second combination frequency, means for detecting both said combination frequencies, filter means associated with said detector to select only waves having a frequency determined largely by said first time interval, other filter means associated with said detector to select only waves having a frequency determined largely by said second time interval, and indicating means operated conjointly by the outputs of both said filter means.

2. In a position indicating system, a first antenna, a second antenna spaced from said first antenna, a third antenna spaced from said first and second antennas on a line normal to the line joining said antenna, a source of radio waves periodically varying in frequency throughout a given range at a constant rate, a transmission system for supplying waves from said source to said first antenna, a second transmission system for supplying waves from said source to said second antenna, including means for delaying the radiation of waves from said second antenna for an appreciable time with respect to the radiation from said first antenna, a third transmission system for supplying waves from said source to said third antenna, including means for delaying the radiation of waves from said third antenna for an appreciable time, differing from said first time, with respect to the radiation from said first antenna, a mobile body, means on said body for receiving waves from all of said antennas, means associated with said receiving means for combining the waves from one pair of said antennas to produce a first difference frequency wave, and combining the waves from another pair of said antennas to produce a second difference frequency wave, means including filter means for selecting said first difference frequency waves and producing therefrom a first current, means including other filter means for selecting said second difference frequency waves and producing therefrom a second current, a device having an indicator and two actuating elements in quadrature relationship, means for supplying said first current to actuate one of said elements and said second current to actuate the other of said elements, whereby said device indicates the direction from said mobile body to said antennas.

3. In a system for indicating the position of a mobile body, a first set of three antennas located at a known position and respectively radiating similar waves periodically varying in frequency throughout a given range at a constant rate differing only in time phase, a second set of three antennas located at a second known position and respectively radiating similar waves periodically varying in frequency throughout a given range at a constant rate differing in time phase from said first waves, means on said mobile body for receiving waves from all said antennas, a detector associated with said receiving means for combining said waves to produce four waves of respectively different combination frequencies, a first device on said body including an angular indicator and two actuating elements in quadrature, means for selecting the two waves of combination frequencies due to the waves from said first set of antennas and producing therefrom two currents, means for supplying said currents to respectively actuate said elements whereby said device indicates the direction from said body to said first set of antennas, a second device on said body including a second angular indicator and two other actuating elements in quadrature, means for selecting the two waves of combination frequencies due to the waves from said second set of antennas and producing therefrom two other currents, means for supplying said two other currents to respectively actuate said other elements, whereby said second device indicates the direction from said body to said second set of antennas and the joint indications of both said devices indicate the position of the mobile body.

4. In a position indicating system, a first antenna, a second antenna spaced from said first antenna, a third antenna spaced from said first and second antennas, a source of radio waves periodically varying in frequency throughout a given range at a constant rate, a transmission system for supplying waves from said source to said first antenna, a second transmission system for supplying waves from said source to said second antenna including means for delaying the radiation of waves from said second antenna for an appreciable time with respect to the radiation from said first antenna, a third transmission system for supplying waves from said source to said third antenna and including means for delaying the radiation of waves from said third antenna for an appreciable time differing from said first time, a mobile body, means on said body for receiving waves from all of said antennas, means associated with said receiving means for combining the waves from one pair of said antennas to produce a first difference frequency wave, and combining the waves from another pair of said antennas to produce a second difference frequency waves, means including filter means for selecting said first difference frequency wave and producing therefrom a first current, and for selecting said second difference frequency wave and producing therefrom a second current, and a device to be controlled operated conjointly by said currents and operated thereby depending on the frequencies of said currents.

RAYMOND A. HEISING.

REFERENCES CITED

The following references are of record in the file of this patent:

UNITED STATES PATENTS

| Number | Name | Date |
| --- | --- | --- |
| 2,183,562 | Hansell | Dec. 19, 1939 |
| 2,248,215 | Budenbom | July 8, 1941 |
| 2,253,975 | Guanella | Aug. 26, 1941 |

FOREIGN PATENTS

| Number | Country | Date |
| --- | --- | --- |
| 811,700 | France | Jan. 23, 1937 |

OTHER REFERENCES

Electronic For March 1939, cover and pp 14-17 and 81-85, copy in Library.